United States Patent [19]

Roy

[11] Patent Number: 4,692,390
[45] Date of Patent: Sep. 8, 1987

[54] METHOD AND SYSTEM FOR HYDROGEN THERMAL-ELECTROCHEMICAL CONVERSION

[75] Inventor: Prodyot Roy, Saratoga, Calif.

[73] Assignee: General Electric Company, San Jose, Calif.

[21] Appl. No.: 897,243

[22] Filed: Aug. 18, 1986

[51] Int. Cl.$^4$ .............................................. H01M 8/06
[52] U.S. Cl. ........................................ 429/17; 429/20
[58] Field of Search ....................... 429/20, 26, 13, 17, 429/19, 50, 16, 101, 104.46

[56] References Cited

U.S. PATENT DOCUMENTS

| | | | |
|---|---|---|---|
| 3,014,084 | 12/1961 | Ciarlariello | 429/17 |
| 3,031,518 | 4/1962 | Werner et al. | 429/16 |
| 3,119,723 | 1/1964 | Crouthamel et al. | 429/20 |
| 3,192,070 | 6/1965 | Tragert et al. | 429/17 |
| 3,245,836 | 4/1966 | Agruss | 429/20 X |
| 3,338,749 | 8/1967 | Johnson et al. | 429/13 |
| 3,357,860 | 12/1967 | Stachurski | 429/101 X |
| 3,368,921 | 2/1968 | McKenzie et al. | 429/16 |
| 3,445,292 | 5/1969 | Childs | 429/20 |
| 3,458,356 | 7/1969 | Kummer et al. | 429/104 X |
| 3,511,715 | 5/1970 | Angus | 429/26 X |
| 3,817,791 | 6/1974 | Greatbatch et al. | 429/101 |
| 4,049,877 | 9/1977 | Sailant et al. | 429/11 |
| 4,443,522 | 4/1984 | Struthers | 429/18 |

Primary Examiner—Anthony Skapars
Attorney, Agent, or Firm—Ivor J. James, Jr.; Raymond G. Simkins

[57] ABSTRACT

A system for converting heat energy into electricity includes a conversion cell comprising a pair of spaced-apart electrodes having an electrolyte therebetween. The electrolyte is selected to pass negatively-charged hydrogen ions and to inhibit the passage of atomic hydrogen and positive hydrogen ions. Inducing a flow of hydrogen through the cell, a current may be generated between the electrodes as electrons are gained by the hydrogen as it enters the cell and lost by the hydrogen as it leaves the cell. In the preferred embodiment, hydrogen flow is induced by reacting the hydrogen leaving the cell with lithium or sodium to form the metal hydride. The metal hydride is then thermally decomposed to release the hydrogen and the molten metal to be recycled to the cell. In this way, the thermal energy used to decompose the metal hydride is converted into electrical energy by passing the hydrogen through the conversion cell.

12 Claims, 2 Drawing Figures

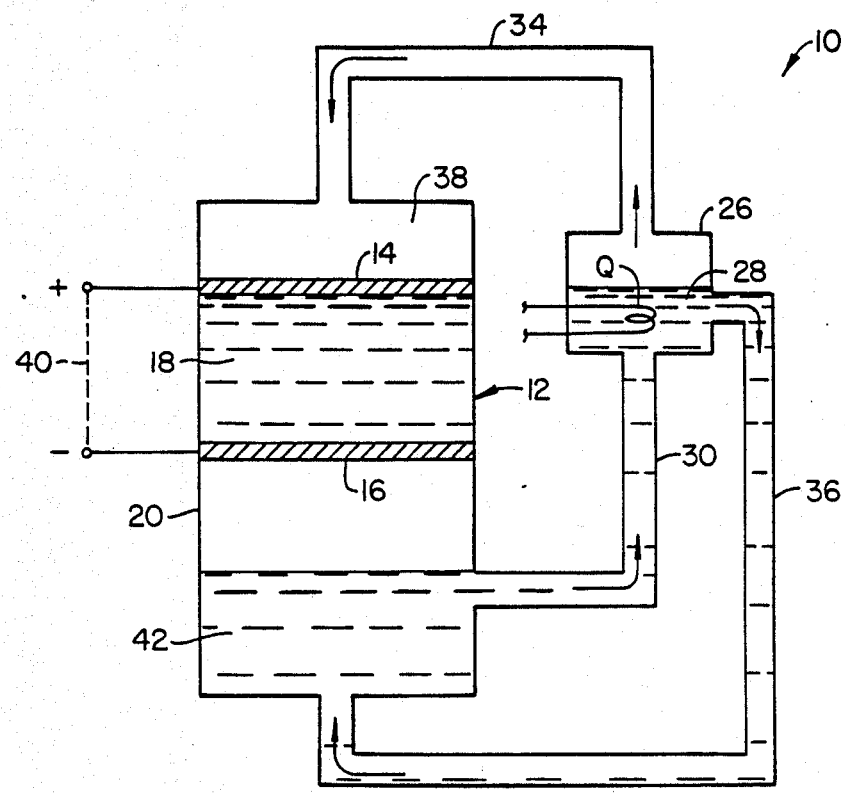
FIG._1.

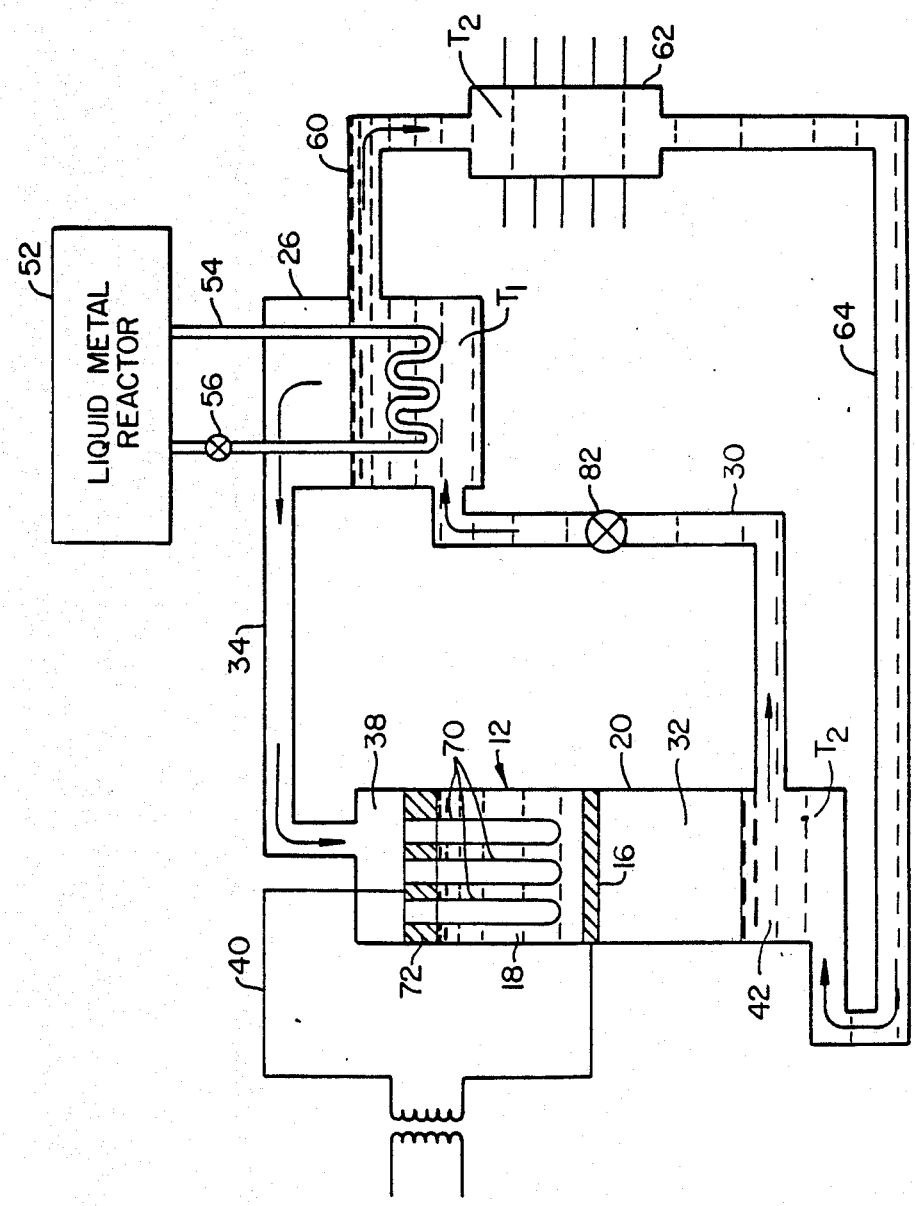
FIG._2.

METHOD AND SYSTEM FOR HYDROGEN THERMAL-ELECTROCHEMICAL CONVERSION

BACKGROUND OF THE INVENTION

1. Field of the Invention

The present invention relates generally to the conversion of heat energy into electrical energy, and more particularly to a method and system for transporting hydrogen ions through a selective electrolyte under a chemical potential gradient to produce electricity.

2. Description of the Background Art

The conversion of chemical energy to electrical energy may be accomplished in a variety of ways. Most commonly, electrochemical cells and batteries rely on redox reactions involving the transfer of electrons from the substance being oxidized to the substance being reduced. By carrying out the reaction in such a way that the reactants do not come into direct contact with each other, it is possible to cause the electrons to flow through an external circuit where they can be used to perform work.

Although invaluable for a number of applications, electrochemical cells do suffer from certain drawbacks. In particular, such cells have a finite life resulting from the exhaustion of the reactants. Although most cells can be recharged by applying a reverse-polarity voltage across the electrodes, such recharging requires a separate electrical source and prevents the continuous operation of the cell over indefinite periods.

To overcome these problems, fuel cells were developed. In general, fuel cells operate by passing an ionizable species across a selective electrolyte which blocks passage of the non-ionized species. By placing porous electrodes on either side of the electrolyte, a current may be induced in an external circuit connecting the electrodes.

The most common fuel cell is the hydrogenoxygen fuel cell where hydrogen is passed through one of the electrodes while oxygen is passed through the other electrode. The hydrogen and oxygen combine at the electrolyte-electrode interface to produce water. By continuously removing the water, a concentration gradient is maintained to induce the flow of hydrogen and oxygen into the cell. Fuel cells of this type have been particularly valuable in manned space flights where they not only provide relatively large amounts of electricity, but also supply drinking water for the personnel.

Despite their usefulness, fuel cells of the type described above suffer from a number of disadvantages. First of all, the fuel cells require a continuous supply of reactant in order to continue to produce electricity. Related to this, the cells also produce a continuous product stream which must be removed. Although disposal of the water produced by hydrogenoxygen fuel cells is seldom a problem, the removal of the product of other fuel cell systems is not always as simple. The second problem relates to the selection and maintenance of the porous electrodes. Electrodes must be permeable to the reactant species entering the cell. Over time, however, such porous electrodes frequently become fouled and plugged so that migration of the reactants through the membrane is slowed. Such slowing results in the reduced production of electricity. Third, the selection of an appropriate electrolyte is not always easy. The electrolyte, which may be a solid electrolyte, must rapidly transport the ionized species in order to increase the current production. Frequently, the limited migration of the ionized species through the electrolyte is a limiting factor on the amount of current produced.

For these reasons, it would be desirable to provide fuel cells which do not require a continuous source of reactants in order to operate. In particular, it would be desirable if the fuel cells could operate with reactants which are regenerated by means of an alternate energy source, preferably heat. Such thermoelectric conversion cells will preferably utilize electrodes and electrolytes which do not become fouled or plugged and which provide for rapid migration of the ionizable species. Finally, such thermoelectric conversion cells will display high current to weight ratios allowing for their utilization in applications where volume and weight are critical, such as space flight.

Certain thermoelectric conversion cells have been proposed. See. e.g., U.S. Pat. No. 3,458,356, where molten sodium is induced to flow across a solid electrolyte by a pressure gradient induced by a temperature gradient. The electrolyte is chosen to selectively pass sodium ions, and a current is generated as sodium atoms lose electrons on entering the electrolyte and gain electrons on leaving the electrolyte. The cell is workable, but suffers from plugging of the porous electrodes required to pass sodium ions. Moreover, diffusion of the sodium ions through the solid electrolytes is relatively slow, limiting the amount of current available from the cell.

Thermally regenerative fuel cells are also described in U.S. Pat. Nos. 3,357,860 and 3,119,723. The following patents are also of interest: U.S. Pat. Nos. 3,014,048; 3,031,518; 3,192,070; 3,338,749; 3,368,921; 3,511,715; 3,817,791; 4,049,877; and 4,443,522.

SUMMARY OF THE INVENTION

According to the present invention, electricity is produced by passing hydrogen gas through an electric conversion cell comprising a pair of spaced-apart electrodes having an electrolyte therebetween. The electrolyte is chosen to selective pass ionized hydrogen and block non-ionized hydrogen, and electric current is generated as the hydrogen loses electrons at one electrode and gains electrons at the other electrode. Thus, a useful current is obtained by connecting an external circuit across the two electrodes.

The use of hydrogen as the sole ionizable species greatly simplifies the design of the cell as a variety of solid electrodes are permeable to hydrogen and suitable for use. Blockage and plugging of electrodes, as encountered in virtually all prior fuel cell applications, is of no concern with the conversion cell of the present invention. Similarly, migration of hydrogen through the electrolyte is rapid, allowing very high current densities based on the area of the electrodes. Thus, the conversion cell of the present invention provides for a very high energy output which does not substantially diminish over time.

Electrical generation using the conversion cell just described, of course, relies on maintaining a continuous hydrogen concentration gradient across the cell. In the preferred embodiment, the concentration gradient is provided by continuously introducing hydrogen gas to a first of the electrodes, while reacting the hydrogen gas with a molten metal at the second electrode to produce a metal hydride. The metal hydride may then be removed from the second electrode and thermally decomposed in order to regenerate the hydrogen and molten metal. In this way, the cells of the present invention can be used in a system for continuously producing electricity from heat. Because of the temperatures required for a thermally decomposing metal hydrides, the system is particularly useful for converting high temperature heat sources, such as coolant from liquid metal cooled nuclear reactors. The system would also be particularly suitable for electrical generation wherever mechanical generators are impractical, such as in spacecraft.

BRIEF DESCRIPTION OF THE DRAWINGS

FIG. 1 is a flow chart illustrating the general operational principles of the present in- vention.

FIG. 2 is a flow chart illustrating a particular embodiment of the present invention.

DESCRIPTION OF THE PREFERRED EMBODIMENTS

Referring to FIG. 1, a system 10 for converting heat energy from a source Q into electricity will be described. The system 10 includes a conversion cell 12 comprising a first electrode 14 and second electrode 16 having an electrolyte 18 contained therebetween. The electrodes 14 and 16 are held in a spaced-apart relationship within a vessel 20 which will be constructed to handle the rigorous operating temperatures described in more detail hereinbelow. The electrodes 14 and 16 will be sealed to the inner wall of vessel 20 so that the electrodes and vessel together define a chamber for holding the electrolyte 18.

The vessel 20 and associated piping (as described below) may be constructed of suitable metals, such as tungsten and molybdenum, or fiber reinforced ceramics. If metal construction is employed, all conductors, including the electrodes 14 and 16 must be electrically insulated from the vessel 20 so that the electrodes remain isolated from each other.

The electrodes are composed of a solid metal which is chemically inert with hydrogen and which allows relatively fast hydrogen penetration. Suitable metals include nickel, palladium, vanadium, zirconium, and niobium, and the like. As illustrated in FIG. 1, the electrodes 14 and 16 are flat plates which are spaced-apart in a parallel manner, but the geometry and dimensions of the electrodes may vary widely. The areas of the electrode(s) will depend on the desired amount of current generation and may vary from several $cm^2$ to several $m^2$ or larger. The electrodes should be as thin as possible consistent with structural integrity and the ability to conduct the expected current densities. Such thin electrodes provide minimum resistance to hydrogen diffusion.

The electrolyte 18 is provided to selectively pass hydrogen ions (and inhibit the passage of non-ionized hydrogen) between the electrodes 14 and 16. Suitable electrolytes include alkali metal salts and alkaline earth metal salts mixed with a metal hydride in an amount from about 5 to 20%, typically about 10%. Conveniently, the electrolyte will be maintained in a liquid state by elevating the temperature. To lower the necessary melting point, eutectic salt mixtures may be employed. Suitable eutectic mixtures include lithium chloride and potassium chloride, lithium iodide and potassium iodide, calcium chloride and calcium hydride, and the like. Suitable metal hydrides include lithium hydride and sodium hydride. Such electrolytes have been found to rapidly pass negatively charged hydrogen ions, while suitably blocking the passage of uncharged and positively charged hydrogen ions.

The spacing of electrodes 14 and 15 and consequent volume of electrolyte 18 is not critical. It is necessary only that sufficient electrolyte 18 be present in order to effectively inhibit the passage of non-ionized hydrogen and positively charged hydrogen ions. Typically, a spacing between electrodes 14 and 16 in the range from about 1 to 5 mm is desired, more typically being about 2 mm.

The system 10 further includes a thermal decomposition vessel 26 which receives heat from a source Q. The decomposition vessel 26 receives a stream of molten metal and metal hydride 28 through conduit 30 from a lower chamber 32 in the vessel 20. The metal hydride 28 is thermally decomposed to hydrogen and molten metal. The hydrogen flows to vessel 20 through an overhead conduit 34 while the molten metal returns to the lower chamber 32 of vessel 20 through a lower conduit 36. The hydrogen enters an upper plenum 38 in the vessel 20 where it is evenly distributed across the upper surface of electrode 14. A concentration gradient exists across the cell 12 as hydrogen passing through the cell is continually depleted in the lower plenum 32. Thus, a driving force exists for inducing a flow of hydrogen across the cell 12, and hydrogen is able to diffuse through the first electrode 14 until it reaches the inner face with electrolyte 18. At that point, the non-ionized hydrogen is unable to penetrate the electrolyte. However, by externally connecting the electrodes by means of an external circuit 40, electrons (generated as discussed hereinbelow) are able to flow from the second electrode 16 to the first electrode 14. There, negative hydrogen ions are produced by the following equation:

$$H + e^- = H^-$$

The negatively ionized hydrogen atoms are thus able to pass through the electrolyte 18 reaching the interface with the second electrode 16. As the hydrogen ions enter the electrode 16, the electrons are lost, regenerating the non-ionized hydrogen and providing a source for the electrons which pass through the circuit 40 to the upper electrode 14. In this way, it will be appreciated that electrical current capable of producing useful work is generated. The non-ionized hydrogen then passes into the plenum 32 where it is able to contact the molten metal 43 which has been recirculated from decomposition vessel 26, as described previously. The hydrogen rapidly reacts with the molten metal to produce metal hydride which is then circulated back to decomposition vessel 26 through conduit 30. It will be appreciated that the molten metal 42 at the bottom of vessel 20 is maintained at a lower temperature than the metal hydride in the decomposition vessel 26, favoring the formation of metal hydride.

The system just described is closed except for the input of heat Q and the output of electricity through external circuit 40, and can thus form a mechanical system converting heat energy to electricity.

Referring now to FIG. 2, a more detailed system for producing electricity according to the method of the present invention will be described. Where possible, FIG. 2 will employ reference numerals corresponding to those employed in FIG. 1.

The source of heat in the system 50 of FIG. 2 is a coolant stream from a liquid metal cooled nuclear reactor 52. The coolant is pumped through an exchange conduit 54 by an electromagnetic pump 56. The decomposition vessel 26 will employ either LiH or an NaH as the metal hydride, depending on the temperature of the liquid metal coolant employed. Typically, LiH will be employed for higher coolant temperatures in the range from about 1000 to 1400° K., while NaH will be employed for lower coolant temperatures in the range from about 600° to 1000° K. At the appropriate temperature $T_1$, the metal hydride will break down into hydrogen, which passes through the overhead conduit 34 to vessel 20, and molten lithium or sodium, which passes through a conduit 60 to a heat exchanger 62. The heat exchanger 62 lowers the molten metal to a temperature $T_2$ where the metal may again combine with hydrogen to form a metal hydride. The cooled molten metal then passes through conduit 64 to the lower plenum 32 of vessel 20 where it is able to react with hydrogen passing from the second electrode 16 of cell 12.

Hydrogen from decomposition vessel 26 passes to the upper plenum 38 of vessel 12 through conduit 34. There, the hydrogen enters a plurality of tubular electrodes 70 which extend downward from a support plate 72. The tubular electrodes 70 are composed of the same materials described previously as suitable for electrodes, and provide an increased electrode surface area to enhance the permeation of the hydrogen into the electrolyte 18 between the support plate 72 and second electrode 16. As described before, the electrodes 70 are isolated from electrode 16, but connected to electrode 16 through external circuit 40. As the hydrogen passes through the tubular electrodes 70, the hydrogen atoms combine with electrons released from electrode 16. The negatively charged ions are able to migrate through the electrolyte 18 rapidly and arrive at electrode 16 where the electrons are given up. The non-ionized hydrogen entering plenum 32 through electrode 16 combines with the molten metal which is at the lower temperature $T_2$. The metal hydride is then pumped through conduit 30 by means of an electromagnetic pump 82 to decomposition vessel 26 where it is again heated to temperature $T_1$ and decomposed into hydrogen and molten metal.

The operational temperature ranges for the preferred LiH and NaH systems of the present invention are as follows:

| Metal | Metal Hydride | $T_1$ (°K.) Broad | $T_1$ (°K.) Narrow | $T_2$ (°K.) Broad | $T_2$ (°K.) Narrow |
| --- | --- | --- | --- | --- | --- |
| Lithium | LiH | 1000–1400 | 1100–1300 | 500–800 | 500–600 |
| Sodium | NaH | 600–1000 | 700–900 | 400–600 | 400–450 |

In operation, systems of the type just described can achieve high current densities based on the electrode areas. The flow rate of liquid metal hydride required will depend on the flow rate of hydrogen, and will be sufficiently rapid to maintain a very low partial pressure of hydrogen in the lower plenum 32, typically in the range from about $10^{-5}$ to $10^{-4}$ mmHg. The voltage generated by the cells will depend on the temperatures employed, while the current will depend on the temperature, electrode area as well as the circulation rate of the liquid metal hydride.

Although for foregoing invention has been described in some detail by way of illustration and example for purposes of clarity of understanding, it will be obvious that certain changes and modifications may be practiced within the scope of the appended claims.

What is claimed is:

1. A method for producing electricity, said method comprising:
   flowing hydrogen through an electric conversion cell comprising a pair of spaced-apart solid metal electrodes which are permeable to hydrogen and which have an electrolyte therebetween chosen to selectively pass ionized hydrogen, whereby an electric current is induced through an external circuit connecting the electrodes.

2. A method as in claim 1, wherein the electrolyte selectively passes $H^-$ and the hydrogen is reduced to $H^-$ at the first electrode and oxidized to H at the second electrode.

3. A method as in claim 1, wherein the hydrogen flow is induced by a chemical potential gradient formed across the cell.

4. A method as in claim 3, wherein the chemical potential gradient results from reaction of hydrogen with a metal to form a metal hydride.

5. A method as in claim 4, wherein the metal is selected from the group consisting of lithium and sodium.

6. A method for producing electricity, said method comprising:
   thermally decomposing a metal hydride at a first temperature to produce hydrogen gas and molten metal;
   directing the hydrogen gas to a first electrode of a cell including a pair of spaced-apart solid electrodes having an electrolyte therebetween chosen to selectively pass ionized hydrogen atoms;
   cooling the molten metal to a second temperature; and
   directing the cooled molten metal to a location adjacent the second electrode so that the metal reacts with hydrogen which has passed through the cell to reform the metal hydride, whereby hydrogen passing through the cell causes an electric current to pass through an external circuit connecting the electrodes.

7. A method as in claim 6, wherein the electrolyte selectively passes $H^-$ and the hydrogen is reduced to $H^-$ at the first electrode and oxidized to H at the second electrode.

8. A method as in claim 7, wherein the metal hydride is lithium hydride, the first temperature is in the range from 1000° to 1400° K., and the second temperature is in the range from 500° to 800° K.

9. A method as in claim 7, wherein the metal hydride is sodium hydride, the first temperature is in the range from 600° to 1000° K., and the second temperature is in the range from 400° to 600° K.

10. A method as in claim 6, wherein the electrolyte is selected from the group consisting of a mixture of lithium hydride and lithium chloride, and a mixture of calcium hydride and calcium chloride.

11. A method as in claim 6, wherein the electrodes are composed of a metal selected from the group consisting of nickel, palladium, vanadium, zirconium, and niobium.

12. A method as in claim 6, wherein the metal hydride is decomposed by exposure to heat obtained from a nuclear reactor.

* * * * *